United States Patent [19]

Wohlfarth

[11] Patent Number: 4,823,897

[45] Date of Patent: Apr. 25, 1989

[54] DRIVE ARRANGEMENT FOR ALL-WHEEL DRIVE VEHICLES

[75] Inventor: Peter Wohlfarth, Ludwigsburg, Fed. Rep. of Germany

[73] Assignee: Daimler-Benz Aktiengesellschaft, Stuttgart, Fed. Rep. of Germany

[21] Appl. No.: 110,865

[22] Filed: Oct. 21, 1987

[30] Foreign Application Priority Data

Nov. 4, 1986 [DE] Fed. Rep. of Germany ....... 3637523

[51] Int. Cl.⁴ ............................................. B60K 17/34
[52] U.S. Cl. .................. 180/75.1; 180/24.09
[58] Field of Search .................. 180/75.1, 333, 22, 23, 180/24.09, 24.08, 245, 246; 74/665 R, 665 B

[56] References Cited

U.S. PATENT DOCUMENTS

| 1,735,984 | 11/1929 | Straussler | 180/75.1 |
| 3,316,994 | 5/1967 | Buhrer | 180/75.1 |
| 4,417,634 | 11/1983 | Quaeck et al. | 180/22 |
| 4,454,925 | 6/1984 | Oswald et al. | 180/22 |
| 4,562,893 | 1/1986 | Cunard | 180/22 |
| 4,574,910 | 3/1986 | Miki et al. | 180/75.1 |

*Primary Examiner*—Richard A. Bertsch
*Attorney, Agent, or Firm*—Barnes & Thornburg

[57] ABSTRACT

A drive arrangement for all-wheel drive vehicles equipped with two axle groups, wherein the input shafts of the axle transmissions of the two axle groups are located on different sides relative to the axle transmission centers; the axle transmissions have a free space on their transmission casing opposite to the input shaft; and the free space of the axle transmission of the axle belonging to the axle group nearest to the transfer gearbox is aligned with the input shaft of the axle transmission belonging to the axle of the other axle group so that a drive shaft driven by the transfer gearbox can be passed through the free space.

14 Claims, 3 Drawing Sheets

DRIVE ARRANGEMENT FOR ALL-WHEEL DRIVE VEHICLES

BACKGROUND AND SUMMARY OF THE INVENTION

The invention concerns a drive arrangement for all-wheel drive vehicles with two axle groups.

In drive arrangements of this type, the transfer gearbox is usually provided with two transmissions sides opposite to one another and is equipped with mutually coaxial output drives which drive the axles belonging to one axle group via one connection shaft in each case.

By this arrangement, it is possible to distribute the input torque evenly between the two axle groups and to use similarly designed axle transmissions for the axle drive. In order to achieve these drive advantages, however, it is necessary to locate the transfer gearbox between the two axle groups.

The invention is based on the objective of providing a drive arrangement which makes these advantageous drive qualities (similar axle transmissions and substantially even torque distribution) possible even when a different arrangement of the transfer gearbox relative to the axle groups, for example near one axle or between the axles of one axle group is necessary.

This objective is achieved by providing an axle transmission having a free space on the transmission housing opposite the input shaft and using the same axle transmission with different orientations in both axle groups.

The free space on the axle transmission of the axle of one axle group is positioned opposite to the input shaft of the axle transmission of the axle belonging to the other axle group. This arrangement makes it possible to pass a connecting shaft leading away from the transfer gearbox for the axle drive of the axle group located remotely from the transfer gearbox through the free space of the axle transmission of at least one axle, adjacent to the transfer gearbox and belonging to the other axle group and to achieve the desired torque distribution.

An advantageous embodiment of the axle transmissions has the input shaft and free space of the axle transmissions at the same lateral distance from the center of the axle transmission. Thus the connecting shafts between the transfer gearbox and the axle transmission to be driven can be a coaxial to the output drive of the transfer gearbox and to the input shaft of the axle transmission to be driven. This embodiment offers the substantial advantage that the transfer gearbox can be installed particularly low in the vehicle, provided the input shaft and free space are provided substantially at the same height on the axle transmissions.

If, in a motor vehicle equipped with a drive arrangement according to the invention, there is a requirement to provide a certain free space on one or both sides of the longitudinal central plane of the vehicle, it is useful to position the center of the axle transmissions substantially in the central plane of the vehicle. In this case, this free space is provided automatically between the connecting shafts and the longitudinal central plane of the vehicle.

If an axle transmission has the input shaft and free space at the same lateral distance from the center of the axle transmission, the distances apart of the input shafts located one on each side of the longitudinal central plane of the vehicle correspond automatically The free space of the axle transmissions can be formed by an opening penetrating the transmission casing, through which opening a connecting shaft driven from the transfer gearbox can be passed. An embodiment of the free space as a hollowed out wall Part is, however, preferred, as being particularly easy to manufacture. A further advantageous embodiment of the invention is an assembly saddle in the free space for receiving an intermediate bearing and intermediate shaft. This design makes it possible to make the connecting shaft between the intermediate shaft of the intermediate bearing and the transfer gearbox shorter and with a diameter which can be substantially smaller than that required where the connecting shaft itself is passed through the free space of the axle transmission adjacent to the transfer gearbox.

Other objects, advantages and novel features of the present invention will become apparent from the following detailed description of the invention when considered in conjunction with the accompanying drawings.

DETAILED DESCRIPTION OF THE DRAWINGS

Figure 1:
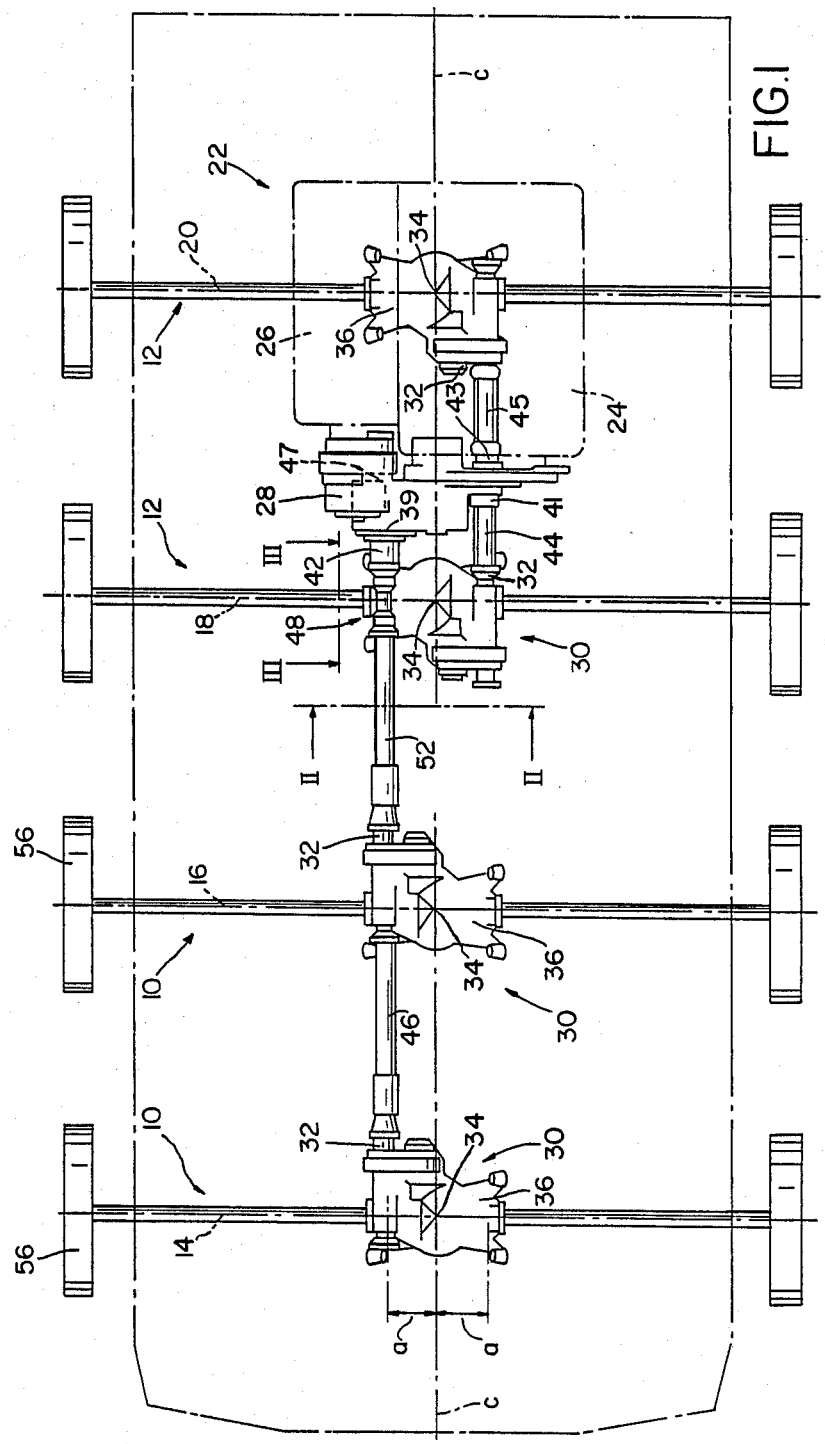
FIG. 1 is a plan view, of a first embodiment example of a drive arrangement of an all-wheel drive vehicle with drive unit located in the rear part of the vehicle.

The motor vehicle shown in FIG. 1, designed for example as a commercial vehicle, is equipped with two axle groups 10 and 12 both of which, for example, include two driven axles 14, 16 or 18, 20. The axles 14, 16 form the front axles of the vehicle and the axles 18, 20 form the rear axles of the vehicle. All the axles 14, 16, 18, 20 are preferably steerable; this is not, however, shown. A drive unit, having an internal combustion engine 24 and a change-speed gearbox 26, is shown by dot-and-dash lines and generally indicated by 22, installed in the rear of the vehicle. The speed gear box 26 drives a transfer gearbox 28 which in turn jointly drive the axles 14, 16 and 18, 20 of the two axle groups 10,12 by their axle transmission 30. The design of the axle transmissions 30 makes possible an arrangement of the transfer gearbox 28 outside the region located between the two axle groups 10, 12 and still makes it possible to distribute the torque (which enters the transfer gearbox 28) at the output of the change-speed gearbox 26 among all the axles 14, 16 18, 20 using axle transmissions 30 having the same design. In the present embodiment example, the transfer gearbox 28 is, for example, located between the two rear axles 18, 20 whereas, in the case of the vehicle according to FIG. 4, it is located between the two front axles 14, 16. Parts which are the same in FIG. 4 as in FIG. 1 have the same reference numbers.

Furthermore, the transfer gearbox 28 is preferably built directly onto the change-speed gearbox 26 of the drive unit 22. It could, of course, also be located outside one of the axle groups 10, 12 and, correspondingly, either behind the rear axle 20 or in front of the front axle 14. The special and identical design of all the axle transmissions 30 makes it possible to run the output drives from the transfer gearbox 28 for the two axle groups 10, 12 to achieve the desired torque distribution to the two axle groups 10, 12. For this purpose, the axle transmissions 30 are each equipped with an input shaft 32 driven from the transfer gearbox 28. The center of the input shaft 32 is located at a distance "a" to the side of the transmission center 34.

Figure 2:
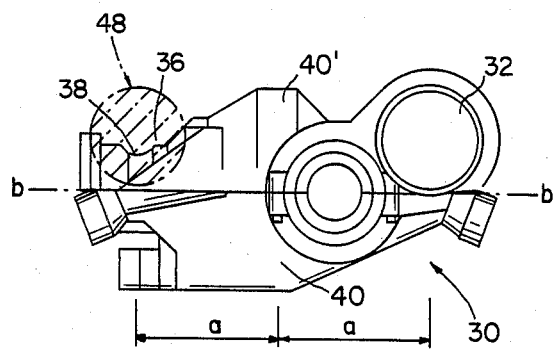
FIG. 2 is an enlarged partial section along the line II—II of FIG. 1.

A free space 36 is provided on the axle transmission 30 on the opposite side of the axle transmission center 34 relative to the input shaft 32. The free space 36, in accordance with FIG. 2, is formed by a correspondingly hollowed-out wall part 38 of their transmission casings 40. The free space 36 extends in the direction of the input shaft 32 continuously over the whole casing width and has the same distance "a" from the transmission center 34 as the input shaft 32. The free space 36 and the input shaft 32 are also preferably located in the upper casing half 40', relative to a horizontal split plane b—b of the transmission casing 40.

Figure 4:
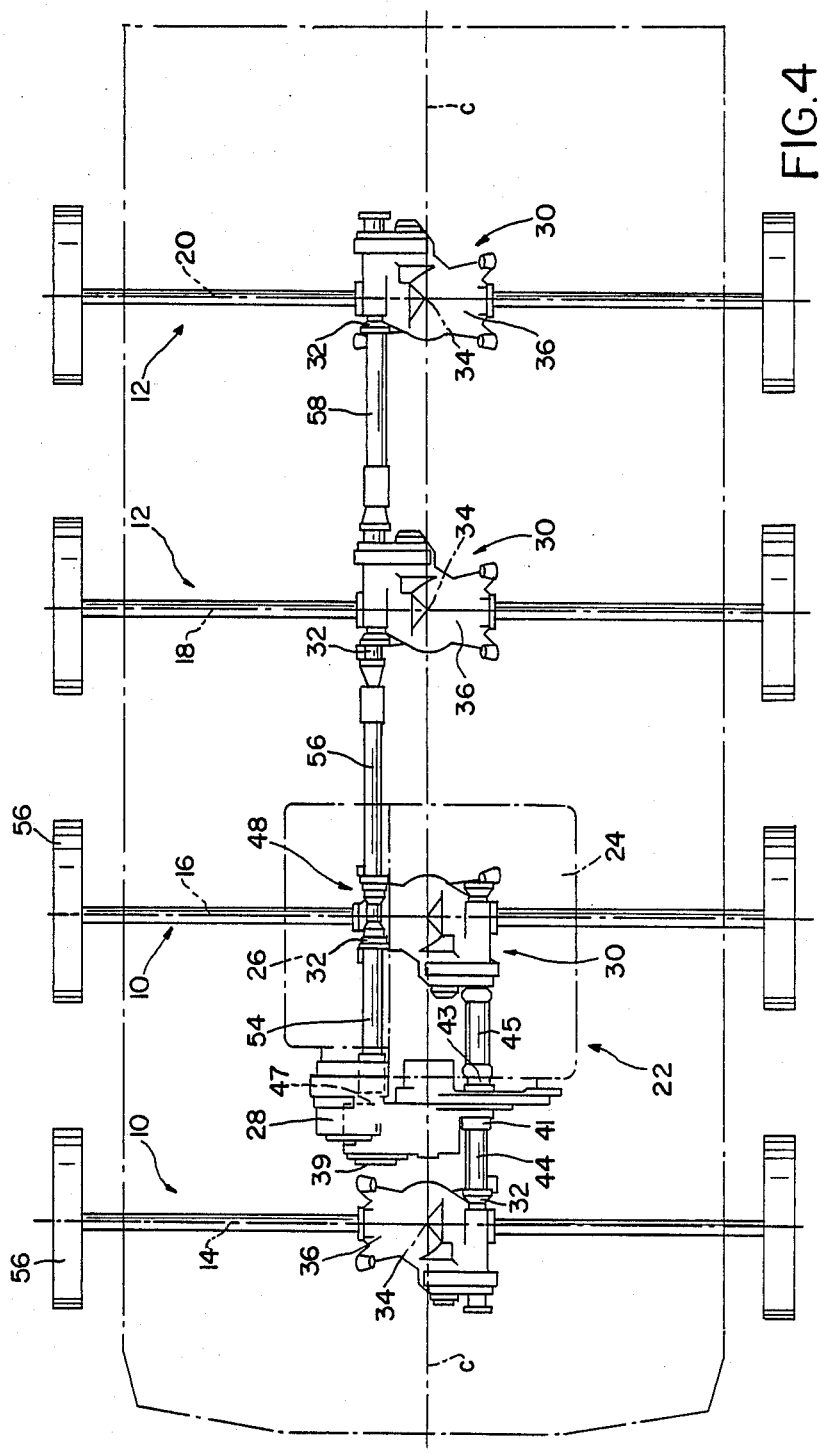
FIG. 4 is a plan view, of a second embodiment example of a drive arrangement of a vehicle with drive unit located in the front part of the vehicle.

As shown in FIGS. 1 and 4, the axle transmissions 30 of the two axle groups 10 and 12 are located relative to one another such that the input shafts 32 of the axle transmissions 30 belonging to an axle group 10 or 12, respectively, are located on sides opposite to one another relative to their transmission centers 34 located in a common vehicle longitudinal plane c—c. In consequence, the coaxial input shafts 32 of the axle transmissions 30 of the axles belonging to one axle group are aligned with the free spaces 36, located one behind the other, of the axle transmissions 30 of the axles belonging to the other axle group. Thus, access is possible from the transfer gearbox 28 via the free spaces 36 of the axle transmission 30 of, for example, the axle group 12 (FIG. 1), on whose side the drive unit 22 is located, to the input shafts 32 of the axle transmissions 30 of the other axle group 10. For this purpose, it is only necessary to pivot the axle transmission 30 of one axle group by 180° relative to the axle transmissions 30 of the other axle group. This displacement of the transmissions could, for example, take place about a horizontal center line. In the embodiment examples shown, on the other hand, the axle transmissions 30 of the axle group 10 are each pivoted relative to those of the axle group 12 by 180° about a vertical axis. This has the advantage that, because of the arrangement of their input shafts and their free spaces 36 in their upper casing halves 40', as shown in FIG. 2, the input shafts 32 of the axle transmissions 30 of both axle groups 10, 12 come to lie in the same plane and parallel to one another.

Since, in the present case, two axle transmissions 30 belong, for example, to each axle group 10 or 12, at least the input shaft 32 of the axle transmission 30 of the axle 16, nearest to the drive unit 22, of the axle group 10 is designed as a through drive shaft. Thus, the input shaft 32 of the axle transmission 30 of the rear axle 14 of this axle group 10 can be driven by it. It is, however, preferable to equip all the axle transmissions 30 belonging to both axle groups 10, 12 with a through drive shaft 32 so that identically constructed axle transmissions 30 can be employed. The selected arrangement of the transfer gearbox 28 relative to the axle groups 10, 12 and the mutual arrangement of the axle transmissions 30 belonging to the two axle groups 10, 12 requires a total of three output drives on the transfer gearbox 28 to drive the axle pairs 14, 16 and 18, 20 of the two axle groups 10, 12. For this purpose, the transfer gearbox 28 has (on its left-hand transmission side as seen in FIG. 1) two output drives 39, 41 preferably aligned with the through drive shafts 32 of the rear axle 18 and the front axle 16. The output drives 39, 41 are also located in a common horizontal plane because of the design of the axle transmissions 30. These output drives 39, 41 are each rotationally solidly connected with the corresponding through drive shafts 32 via a connecting shaft 42 or 44. A third output drive 43 is located on the transmission side opposite the two output drives 39, 41 mentioned. This drive 43 is preferably aligned with the output drive 41 for the connecting shaft 44 and is connected to a connecting shaft 45 which drives the through drive shaft 32 of the axle transmission 30 belonging to the rear axle 20.

By this arrangement, the connecting shaft 42 can pass through the free space 36 of the axle transmission 30 of the rear axle 18 and be led directly to the through drive shaft 32 of the axle transmission 30 belonging to the front axle 16. The front axle 14 is driven in turn by front axle 16 via a transmission shaft 46 through drive shaft 32.

Figure 3:
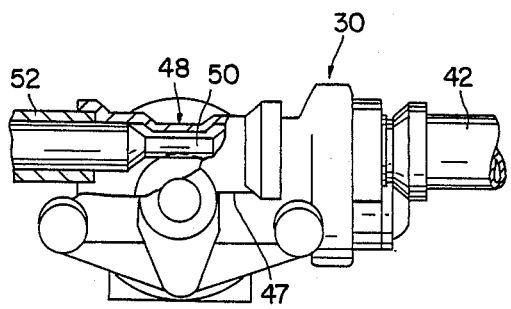
FIG. 3 is an enlarged partial view along the line III—III of FIG. 1.

In order to keep the length of connecting shaft 42, and hence its diameter, appropriately small, an intermediate bearing 48 is mounted on a saddle 47 in the free space 36 of the axle transmission 30 belonging to the rear axle 18. An intermediate shaft 50 is rotationally supported in the bearing 48 (FIG. 3). This intermediate shaft 50 is flanged, at one end, onto the connecting shaft 42 and, at the other end, onto a transmission shaft 52 leading to the axle transmission 30 of the front axle 16. Because of the identical design of the axle transmissions 30 belonging to both axle groups 10, 12 and because of their arrangement with the transmission center 34 lying on the longitudinal central plane c—c of the vehicle, the transmission shafts 46, 52 belonging to the axle group 10 are also at a lateral distance "a" to the longitudinal central plane of the vehicle. The distance "a" provides a free space valuable for certain design purposes on vehicles. For example, it can be used advantageously where parts of a vehicle superstructure have to be located particularly low in the chassis.

In the case of a rear or front arrangement of the drive unit 22 in a vehicle, it can be sufficient to equip the transfer gearbox 28 with three output drives 39, 41, 43 for the connecting shafts 42, 44 and 45, as already mentioned. In the case of a front installation of the drive unit 22, however, it would then be necessary to install this rotated by 180° about a vertical axis.

In order, however, to retain the fitting position of the drive unit 22 provided for rear drive, as shown in FIG. 1, in the front part of the vehicle, as shown in FIG. 4, the transfer gearbox 28 is equipped with a further output drive 47 on its transmission side facing towards the rear axle 20. The intermediate shaft 50 of an intermediate bearing 48 mounted in the free space of the axle transmission 30 belonging, for example, to the front axle 16 can be driven by output drive 47 via a connecting shaft 54. This intermediate shaft 50 in turn drives the rear axles 18, 20 via transmission shafts 56, 58 while the front axles 14 and 16 are driven via the connecting shafts 44 and 45. For simplicity, the axles 14, 16, 18 and 20 are drawn such that they simultaneously represent axle shafts leading from the axle transmissions to the vehicle wheels 56. The wheel suspension and wheel guidance can, however, be designed in any appropriate manner.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. In a drive arrangement for all-wheel drive vehicles with two axle-groups, each of which includes at least one axle driven by an axle transmission, the input shafts of the axle transmissions being driven by a transfer gearbox which has output drives connected with each axle group via one connecting shaft each, the improvement comprising:

said input shafts of said axle transmissions of said two axle groups are located on different sides relative to the axle transmission centers;

said axle transmissions have a free space on their transmission casing opposite to said input shaft; and said free space of an axle transmission of the axle belonging to the axle group nearest to said transfer gearbox is aligned with the input shaft of the axle transmission belonging to the axle of the other axle group so that a drive shaft driven by said transfer gearbox can be passed through said free space.

2. Drive arrangement according to claim 1, wherein said input shaft and said free space of said axle transmissions are at the same lateral distance from said axle transmission center.

3. Drive arrangement according to claim 2, wherein said axle transmission center is substantially located in the longitudinal central plane of the vehicle.

4. Drive arrangement according to claim 2, wherein said free space and said input shaft have substantially the same height in an upper part of the axle transmission.

5. Drive arrangement according to claim 4, wherein said axle transmission center is substantially located in the longitudinal central plane of the vehicle.

6. Drive arrangement according to claim 5, at least one further output drive on said transfer gearbox coaxial with one of two output drives on said transfer gearbox and on a side opposite to the side having said two output drives.

7. Drive arrangement according to claim 1, wherein said free space of the axle transmission is a hollowed-out wall part of a transmission casing.

8. Drive arrangement according to claim 7, including:
an assembly saddle in the free space of the axle transmission;
an intermediate bearing in said assembly saddle; and
an intermediate shaft supported in said intermediate bearing and connected at both ends rotationally solid with one of said connection shafts.

9. Drive arrangement according to claim 8, wherein at least one of said two axle groups includes at least two axles whose axle transmissions have coaxial input shafts and coaxial free spaces, and at least the axle transmissions of the axle group located remotely from the transfer gear box have a drive shaft that passes through a free space of an axle transmission of the other axle group as the input shaft.

10. Drive arrangement according to claim 1, wherein said free space and said input shaft have substantially the same height in an upper part of the axle transmission.

11. Drive arrangement according to claim 10, wherein said axle transmission center is substantially located in the longitudinal central plane of the vehicle.

12. Drive arrangement according to claim 1, including at least one further output drive on said transfer gearbox coaxial with one of two output drives on said transfer gearbox and on a side opposite to the side having said two output drives.

13. Drive arrangement according to claim 1, wherein all of said axle transmissions are identical in shape and within an axle group have coaxial input shafts.

14. Drive arrangement according to claim 1, wherein said nearest axle group includes at least two axles and said transfer gear box is between said two axles of said nearest axle group.

* * * * *